(12) United States Patent
Hendrix

(10) Patent No.: US 9,587,666 B2
(45) Date of Patent: Mar. 7, 2017

(54) PROTECTANT-INJECTABLE NUT

(71) Applicant: Joseph M. Hendrix, Nahunta, GA (US)

(72) Inventor: Joseph M. Hendrix, Nahunta, GA (US)

( * ) Notice: Subject to any disclaimer, the term of this patent is extended or adjusted under 35 U.S.C. 154(b) by 97 days.

(21) Appl. No.: 14/607,243

(22) Filed: Jan. 28, 2015

(65) Prior Publication Data

US 2015/0204371 A1    Jul. 23, 2015

(51) Int. Cl.
  *F16B 37/00*    (2006.01)
  *F16B 37/14*    (2006.01)
  *F16B 33/00*    (2006.01)

(52) U.S. Cl.
  CPC .......... *F16B 37/145* (2013.01); *F16B 33/008* (2013.01)

(58) Field of Classification Search
  CPC ........ F16B 33/008; F16B 37/00; F16B 37/14; F16B 37/145
  USPC ................. 411/427, 428, 429, 431
  See application file for complete search history.

(56) References Cited

U.S. PATENT DOCUMENTS

| | | | | |
|---|---|---|---|---|
| 4,070,048 A * | 1/1978 | Young | ................. | E05B 65/1033 292/179 |
| 4,521,146 A * | 6/1985 | Wharton | ............... | F16B 41/005 411/1 |
| 4,569,808 A * | 2/1986 | Smali | .................... | B29C 73/025 156/382 |
| 4,645,397 A * | 2/1987 | Howe | ................... | F16B 41/005 411/372.6 |
| 5,033,952 A * | 7/1991 | Haug | ...................... | F16B 13/00 405/259.5 |
| 5,590,992 A * | 1/1997 | Russell | ...................... | B60B 7/14 301/37.374 |
| 5,881,523 A * | 3/1999 | Quatrochi, Jr. | ..... | E04G 23/0203 52/514.5 |
| 6,164,888 A * | 12/2000 | Kocks | ..................... | F16B 37/16 411/428 |
| 6,273,658 B1 * | 8/2001 | Patterson | .................. | B60B 3/16 301/37.374 |
| 7,025,176 B1 * | 4/2006 | Tooman | .................. | F16N 11/00 118/244 |
| 2007/0237605 A1 * | 10/2007 | Duncan | ..................... | F16B 3/06 411/351 |
| 2012/0267890 A1 * | 10/2012 | Gurney | ................. | F16L 37/138 285/308 |
| 2014/0341675 A1 * | 11/2014 | Dobbin | .................. | B64D 45/02 411/82.1 |

* cited by examiner

*Primary Examiner* — Roberta Delisle
(74) *Attorney, Agent, or Firm* — Jonathan R. Smith; Jonathan Rigdon Smith, J.D., PC

(57) ABSTRACT

A grease nipple is installed in a modified dome nut to allow corrosion-retardant fluid to be squeezed into the spaces within the dome nut around the lug and exposed thread surfaces using a grease gun.

7 Claims, 2 Drawing Sheets

(Section A-A' of Fig. 4)

(Section A-A' of Fig. 4)

PROTECTANT-INJECTABLE NUT

CROSS-REFERENCES TO RELATED APPLICATIONS

This non-provisional application for patent claims priority of U.S. provisional application Ser. No. 61/935,890 filed Feb. 5, 2014.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A BIOLOGICAL SEQUENCE LISTING

Not applicable.

BACKGROUND OF INVENTION

Field of the Invention

This invention is in the field of mechanical fasteners, more particularly in the field of threaded fasteners, and still more particularly in the field of fasteners exposed to the elements or other corrosive conditions.

Description of the Related Art

A very common fastener is the combination of a threaded nut and bolt. After a nut is fastened onto a bolt (or a threaded stud) and left exposed to air, their surfaces become corroded over an amount of time dependent on the material they are made of, the amount of moisture in the air, and the presence of electrolytes such as salts. After corrosion occurs, the amount of torque necessary to loosen the nut from the bolt can become significantly greater than that used to tighten the nut in the first place.

Conditions for such corrosion are commonly found in the environment of vehicle wheel lug nuts and the threaded studs (lugs) onto which they are tightened. Moist air and salts easily access the lugs and lug nuts even when wheel covers or hub caps are in place. The result is that by the time it is necessary to loosen the lug nuts for tire rotation, the impact wrenches used can crack the studs or nuts, creating the possibility of mechanical failure at high speed.

BRIEF DESCRIPTION OF THE INVENTION

Objects of the Invention

The object of the invention is to enable a high-viscosity grease or other protective fluid to be squeezed into all void spaces between a nut and bolt, particularly a lug nut and the corresponding wheel lug or stud, without loosening or removing the nut.

Many lug nuts are in the form of an "acorn nut" or "dome nut" (see FIG. 1) which cover all of the lug threads. In this case, an object of the invention is to provides a means for injecting protective fluid under the dome.

SUMMARY OF THE INVENTION

A grease nipple is installed in a modified dome nut to allow corrosion-retardant fluid to be squeezed into the spaces within the dome nut around the lug and exposed thread surfaces using a grease gun.

DETAILED DESCRIPTION OF THE INVENTION

Figure 1:
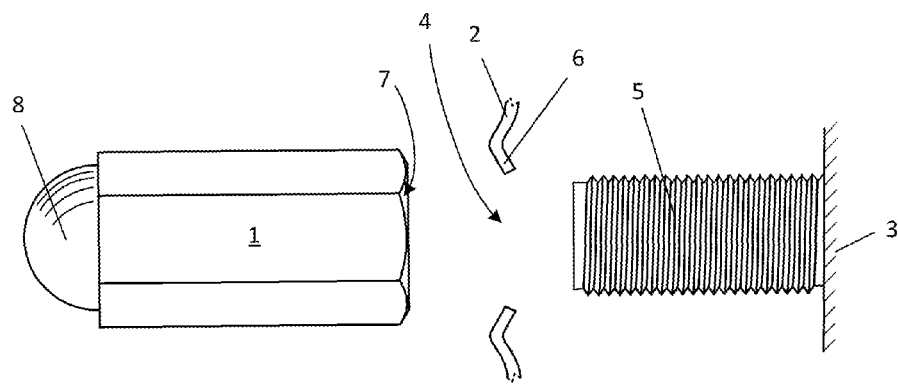
FIG. 1 is a front view of a prior art dome nut used as a lug nut.

Referring now to the drawings, in which like features in the several figures are represented by like indicia used in this description, FIG. 1 is a front view of a prior art dome nut used as a lug nut 1 to fasten a tire rim 2 to the wheel 3 of a vehicle (not shown). All parts shown in this and all other figures are metal. The lug nut 1 has a threaded lug bore (not visible) cut into its right end (in this view) and a domed left end 8 covering the threads at that end. A hole 4 in the rim 2 is placed over a threaded lug 5, and when the rim 2 is fully seated on the lug 5, the lug nut 1 is screwed tightly down onto the lug 5. This compresses the flange 6 on the rim 2 tightly between the bevel 7 on the lug nut 1 and the wheel 3. Fastening the rim to the wheel tightly in this manner keeps the lug nut 1 from loosening from the lug 5, but the seal is not water tight; over time, corroding matter gets in between the rim 2 and the lug 5. To solve this problem, putting a water tight (compressible) washer between the rim 2 and the wheel 3 and/or the bevel 7 comes to mind, but doing so would prevent tight frictional binding of metal against metal and would allow the lug nut 1 to loosen.

Figure 2:
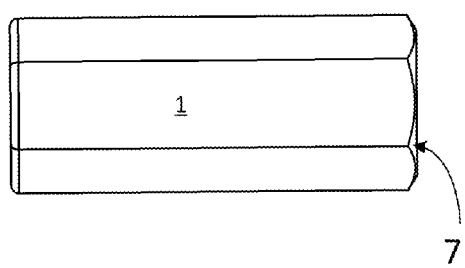
FIG. 2 is the front view of the invention.

FIG. 2 is the front view of the invention, a protectant-injectable nut, in this case a lug nut for holding tire rims on a vehicle wheel. It comprises a lug nut 1 also showing a bevel 7 at the right end in this view which performs the same function as in FIG. 1.

Figure 3:
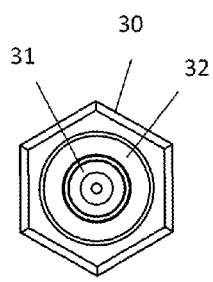
FIG. 3 is a left end view of the invention.

FIG. 3 is a left end view of the invention. It shows the typical hexagonal profile 30 of a lug nut, but in place of the dome, a grease nipple 31 is screwed into the bottom of a grease gun bore 32. A lug nut cap (not shown) may, within the scope of this invention, be optionally fitted to the left end of the nut to keep dirt from accumulating around the grease nipple 31.

Figure 4:
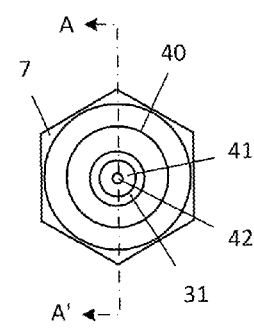
FIG. 4 is a right end view of the invention.

FIG. 4 is a right end view of the invention. The bevel 7 for seating the lug nut surrounds this end as in a conventional lug nut. The usual threaded lug bore 40 is cut most of the way through so that the distal or bottom end 41 of the grease nipple 31 is visible. The central bore 42 of the grease nipple 31 can also be seen.

Figure 5:
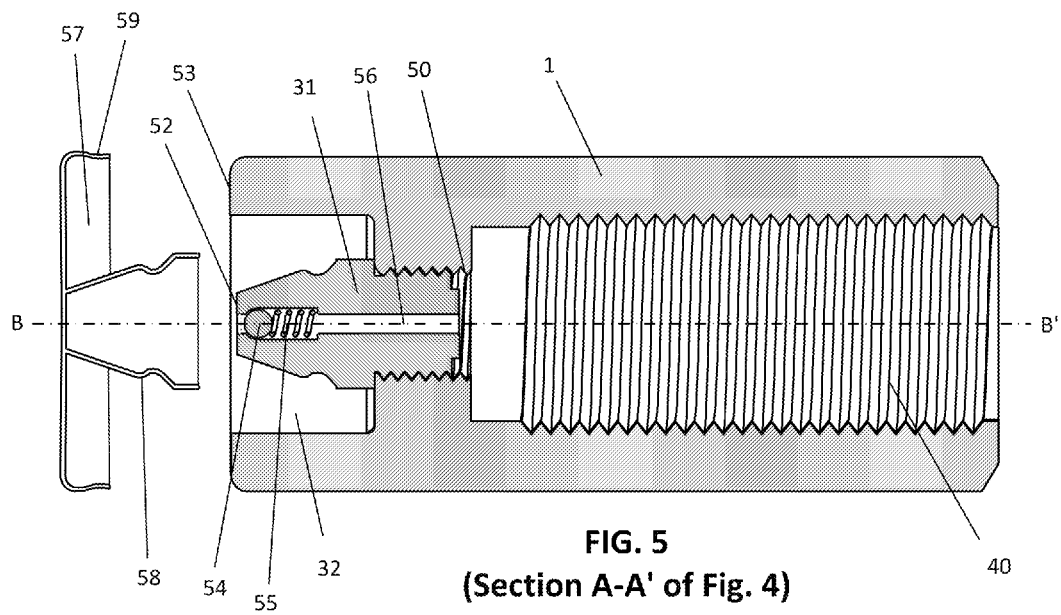
FIG. 5 is a cross-sectional front view of the invention.

FIG. 5 is a cross-sectional front view of the invention, Section A-A' of FIG. 4. It shows the lug nut 1 with the grease gun bore 32 at the left end and the threaded lug bore 40 to fasten to the lug at the right end. An internal threaded bore 50 is shown joining the grease gun bore 32 and the threaded lug bore 40. All three of these bores have centerlines that are shown collinear with each other and with the centerline B-B' of the lug nut, however, it is within the scope of this invention that these bore holes not be collinear, so long as they form a continuous liquid passage.

The grease nipple 31 is screwed into the internal threaded bore 50; however, it is within the scope of this invention to attach the grease nipple 31 to the lug nut 1 by other means, such as a friction fit, or even to fabricate the lug nut and grease nipple as a single piece of material. The grease gun bore 32 should be deep enough so that the grease nipple tip 52 is recessed within the grease gun bore 32 in order for the left face 53 of the lug nut 1 to protect it as the lugs revolve around the wheel axle (not shown). While this is a desirable feature, the scope of this invention does not require a grease gun bore this deep, or even one at all. If it is present, it is necessary that the grease gun bore have a diameter sufficient to accept the tip of a grease gun (not shown). It is within the scope of this invention that the grease gun bore 32 have a different shape (e.g., threaded, conical, dished, etc.) so long as it can accept the tip of a grease gun. The grease nipple 31 has a check valve in the form of a spherical check ball 54 which is normally held to the left in a closed position by a spring 55. When it is desired to inject corrosion protectant fluid into the threaded lug bore 40, the tip of a grease gun fitted with a cartridge of grease or other corrosion protectant is fitted onto the grease nipple 31 and squeezed. The pressure of the fluid pushes the check ball 54 to the right, creating a fluid passage through the center grease nipple bore 56 and into the interstices between the lug threads and the lug nut threads. Other types of check valves may be used within the scope of the instant invention. While a check valve in the grease nipple 31 is desirable, the scope of the invention does not require one, and a cap fitted to the grease nipple 31 and/or the left face 53 may be substituted for a check valve. A cap 57 is depicted having a grease nipple gripping part 58 and a left face gripping part 59, both of which engage the grease nipple 31 and the left face 53 simultaneously when it is pushed to the right in this view.

If desired, the threaded lug bore 40 may be pre-loaded with protectant fluid before the lug nut 1 is screwed onto the lug 5 (see FIG. 1). It is recommended that the invention be used then anyway to force protectant fluid into all available spaces so that all surfaces, especially thread surfaces that will corrode and resist loosening, are covered with protectant.

Figure 6:
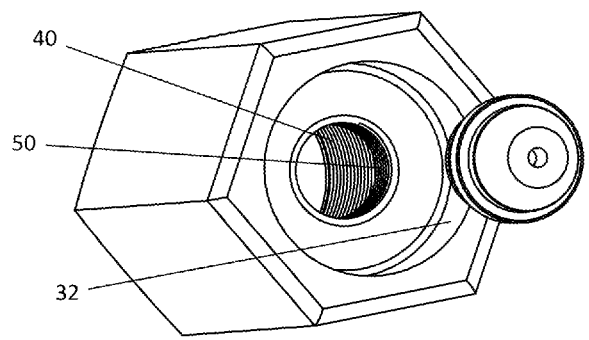
FIG. 6 is an exploded view of the invention.

FIG. 6 is an exploded view of the invention giving a better view of the grease gun bore 32, joining the internal threaded bore 50, which in turn joins the threaded lug bore 40.

The invention claimed is:

1. A liquid-injectable lug nut for a vehicle wheel, comprising:
    a nut having
        a left end, a right end, and a substantially horizontal axis passing through the left and right ends;
        a threaded lug bore substantially coaxial with the axis, beginning at the right end and extending far enough leftward into the nut to fit a mating wheel lug on a vehicle wheel;
        the lug bore having an internal lug bore left face;
        a grease gun bore substantially coaxial with the axis, beginning at the left end and extending a distance rightward into the nut short of the left face;
        an internal nipple bore coaxial with the axis, connecting the right end of the grease gun bore with the left end of the lug bore.

2. The liquid-injectable lug nut of claim 1, comprising:
    a grease nipple having
        a leftward-projecting fluid entry tip;
        a rightward facing male portion;
        a fluid passage substantially coaxial with the axis connecting the fluid entry tip to the right end of the rightward facing male portion;
            the rightward facing male portion fitted into said internal nipple bore.

3. The liquid-injectable lug nut of claim 2, wherein:
    said grease gun bore:
    extends far enough rightward into said nut that said fluid entry tip is no farther leftward of a plane perpendicular to said axis at the left end of said nut; and
    has an internal diameter so dimensioned as to allow the tip of a grease gun to be attached to said grease nipple.

4. The liquid-injectable lug nut of claim 3, wherein:
    said grease nipple comprises a check valve allowing fluid to pass only rightwardly through said grease nipple.

5. The liquid-injectable lug nut of claim 3, in which a removable nipple cap is fitted over either:
    (a) said grease nipple;
    (b) said first left end; or
    (c) both.

6. A liquid-injectable lug nut for a vehicle wheel, comprising:
    a nut having
        a left end, a right end, and a substantially horizontal axis passing through the left and right ends;
        a threaded lug bore substantially coaxial with the axis, beginning at the right end and extending far enough leftward into the nut to fit a mating wheel lug on a vehicle wheel;
        the lug bore having an internal lug bore left face;
        a grease gun bore substantially coaxial with the axis, beginning at the left end and extending a distance rightward into the nut short of the left face;
        an internal nipple bore coaxial with the axis, connecting the right end of the grease gun bore with the left end of the lug bore and having an internal diameter;
    a grease nipple having
        a leftward-projecting fluid entry tip;
        a rightward facing male portion;
        a fluid passage substantially coaxial with the axis connecting the fluid entry tip to the right end of the rightward facing male portion; and
        the rightward facing male portion fitted into the internal nipple bore; and
        the grease gun bore extending far enough rightward into the nut that the fluid entry tip is no farther leftward of a plane perpendicular to the axis at the left end of the nut, the internal diameter so dimensioned as to allow the tip of a grease gun to be attached to the grease nipple.

7. The lug nut of claim 6, further comprising:
    a dirt cap taken from the list comprising:
    (a) a dirt cap shaped to removably grip said grease nipple;
    (b) a dirt cap shaped to removably grip the left end of the nut; and
    (c) a dirt cap shaped to removably grip both the grease nipple and the left end of the nut at the same time.

* * * * *